Feb. 18, 1930.   J. L. MacINERNEY   1,747,374
SPRING CONSTRUCTION
Filed June 25, 1927
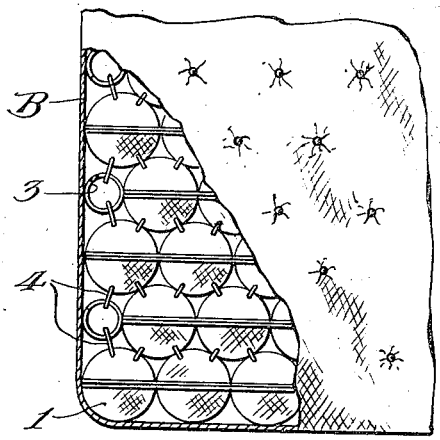
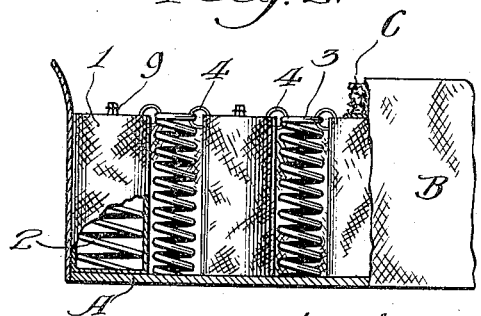
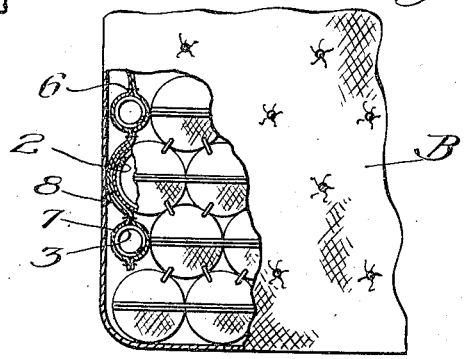
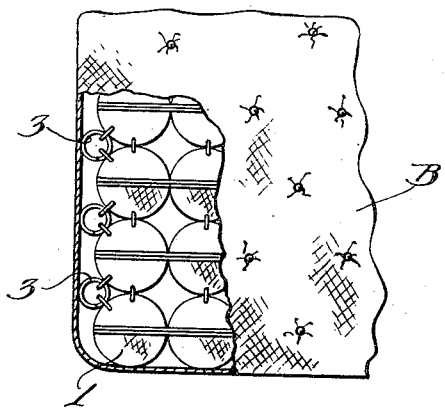
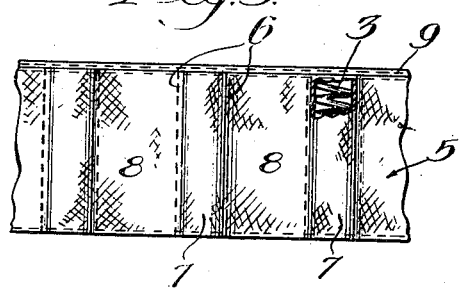
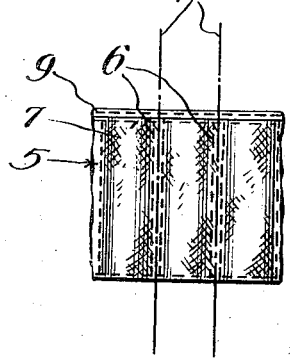
Inventor:
James L. MacInerney
by Bertha L. MacGregor
his Atty.

Patented Feb. 18, 1930

1,747,374

UNITED STATES PATENT OFFICE

JAMES L. MacINERNEY, OF GRAND RAPIDS, MICHIGAN

SPRING CONSTRUCTION

Application filed June 25, 1927. Serial No. 201,424.

This invention relates to improvements in spring constructions, and may be applied to automobile seats, furniture upholstery, cushions, mattresses and the like.

It has been customary in the construction of automobile seats to prepare a spring filled mat for the interior of the seat, the springs being enclosed in fabric pockets to separate them from each other. In order to provide strong and durable side edges for the seat, two or more coiled springs have been placed in each of the pockets constituting the side rows of pockets of the spring mat. This construction is objectionable for several reasons, and particularly because some types of filling machines are not adapted to place more than one spring in a pocket, so that hand labor is required.

My invention contemplates the use of springs of relatively small diameter and stronger and stiffer than ordinary cushion springs, in combination with the usual fabric pocketed, coiled springs constituting the mat or interior of the structure. By my said invention I obviate the necessity for using double or triple springs in certain of the pockets, and avoid the use of hand labor. I also lessen the amount of upholstery padding heretofore required to fill the spaces between the springs constituting the edge rows and the outer covering.

In the drawings:

Figure 1 is a plan view of a seat construction, broken away, showing my invention as applied to a construction wherein the springs are in "nested" or staggered arrangement.

Figure 2 is a side elevation, partly in section and broken away, to show the interior edge construction.

Figure 3 is a view similar to Figure 1, showing my invention as applied to a construction wherein the springs are in what is called "square" arrangement.

Figure 4 is a view similar to Figure 1, partly in section, showing a modification of the invention.

Figure 5 is a side view, showing part of the spring filled fabric strip used in the modified form illustrated in Figure 4.

Figure 6 shows a modified form of strip.

In the drawings, I have shown my invention as being embodied in an automobile seat, but as stated, it may be applied to mattresses and other spring-filled structures.

A indicates the usual base or support; B, the outer covering, and C, upholstery padding. A plurality of fabric strips formed into pockets 1 of the type shown in the Marshall Patent, No. 685,160, contain coiled springs 2. The strips may be arranged so that the springs will be in nested or staggered relation, as shown in Figures 1 and 4, or be side by side to make the square arrangement shown in Figure 3. Adjacent rows of springs 2 in pockets 1 are preferably stitched, or stapled, together to retain them in proper position within the upholstery cover B. Between the spring-filled pockets 1 forming the side or edge of the seat, I place an auxiliary coiled spring 3 of much smaller diameter than the springs 2, and made of stronger wire to produce a spring much stiffer than the springs 2 in the body of the mat. The size of the springs 3 may be varied according to the size and arrangement of the springs 2. For instance, when the springs 2 are nested, I prefer to use auxiliary springs 3 of larger size than those used with springs 2 in "square" arrangement.

The springs 3 shown in Figures 1, 2 and 3 are not covered, and are held in place by hog rings 4 or other suitable means connecting said springs 3 to the adjacent springs 2. The space between the springs 2 and 3 and the cover B is filled with upholstery padding C (omitted from the plan view for the sake of clearness).

It will be noted that the use of my invention very materially reduces the space to be padded between the edge row of pockets and the cover B, and especially so in the nested form.

In Figures 4 and 5, I have shown a fabric strip 5, folded upon itself and stitched transversely at 6 to form pockets 7 for the springs 3, and intermediate sections 8 between the pockets 7. After the springs 3 are inserted in the pockets 7, the strip 5 is stitched longitudinally as indicated at 9 to close the pockets 7, and said strip attached to the edge row of pockets 1. The use of this form produces a very firm side edge for the seat construction, in which the auxiliary springs 3 are completely enclosed in fabric pockets 7 and the fabric sections 8 between said pockets are utilized to connect and hold the springs 3 and 2 in proper relative position as well as to overlie and protect the edges of the springs 2. The springs 3 in the fabric strips 5 may be connected to the body springs 2 in any desired manner.

In Figure 6, I have shown a strip 5 stitched at 6 to form pockets 7 for holding the springs 3, but the intermediate sections 8 are eliminated, only sufficient fabric being left between the lines of stitches 6 forming each pocket, to permit cutting as indicated by the lines 10. After the springs 3 are placed in the cut apart pockets 7, they are connected to the body springs 2 by hog rings 4, or by stitching.

From the foregoing, it will be apparent that I have produced a seat or mattress construction having a firm, strong edge, without having to use double or triple springs in certain of the pockets and without the consequent hand labor required to assemble the same; and a construction wherein a smooth side edge is produced without the use of an undue quantity of padding material.

It is manifest that coiled springs in fabric pockets of a type other than the "Marshall", herein shown and described, may be used to form the body of the spring mat.

I claim as my invention:

A spring construction comprising a plurality of fabric pockets, a coiled spring in each pocket, said pocketed springs being connected together to form a unitary structure, a fabric strip folded longitudinally upon itself and stitched transversely to form pockets and intermediate sections, an auxiliary spring in each pocket, the said pocketed auxiliary springs being arranged between the springs constituting an edge row of the spring structure, and the intermediate strip sections between the auxiliary spring pockets being parallel with and adjacent to the outer side walls of the springs of the edge row between said auxiliary springs.

In testimony that I claim the foregoing as my invention I affix my signature this 21 day of June, 1927.

JAMES L. MacINERNEY.